July 26, 1938.  B. J. DAVIDSON  2,124,868
CARTON
Filed July 6, 1936   3 Sheets-Sheet 1

BRUCE J. DAVIDSON
INVENTOR-

BY Henry Savage
ATTORNEY

July 26, 1938.　　　B. J. DAVIDSON　　　2,124,868
CARTON
Filed July 6, 1936　　　3 Sheets-Sheet 2

BRUCE J. DAVIDSON
INVENTOR-
BY Henry Savage
ATTORNEY

July 26, 1938.  B. J. DAVIDSON  2,124,868
CARTON
Filed July 6, 1936  3 Sheets-Sheet 3

Fig. 14-A

BRUCE J. DAVIDSON
INVENTOR-
BY Henry Savage
ATTORNEY-

Patented July 26, 1938

2,124,868

UNITED STATES PATENT OFFICE 2,124,868

CARTON

Bruce J. Davidson, Kew Gardens, N. Y., assignor to National Biscuit Company, New York, N. Y., a corporation of New Jersey Application July 6, 1936, Serial No. 89,206

7 Claims. (Cl. 229—51)

My invention relates to cartons such as are commonly used for packaging many kinds of merchandise. It is highly desirable to have these cartons open easily and at the same time be sealed so tightly as to prevent the sifting out of fine or powdered material and to prevent the entry of weevils and other minute insects. Heretofore, it has not been possible to accomplish these advantages except each at the expense of the other, and the latter only by the use of additional material for making the carton.

Among the objects of the present invention, therefore, are to provide a carton that can be easily opened and will present a neat appearance when reclosed.

Another object is to provide a commercially tight package, at both the top and bottom, without using any more material than is used in ordinary packages.

Another object is to provide a commercially tight package that uses less material than an ordinary package, yet can be easily opened.

The above and other objects, that will be apparent to those skilled in this art, are attained by the forms of the invention that are illustrated in the accompanying drawings wherein Fig. 1 shows a single piece blank from which the carton is made.

Figs. 14 and 14A show the blanks for forming the body and top, respectively, of a form of the invention using a minimum of material.

Figure 1:
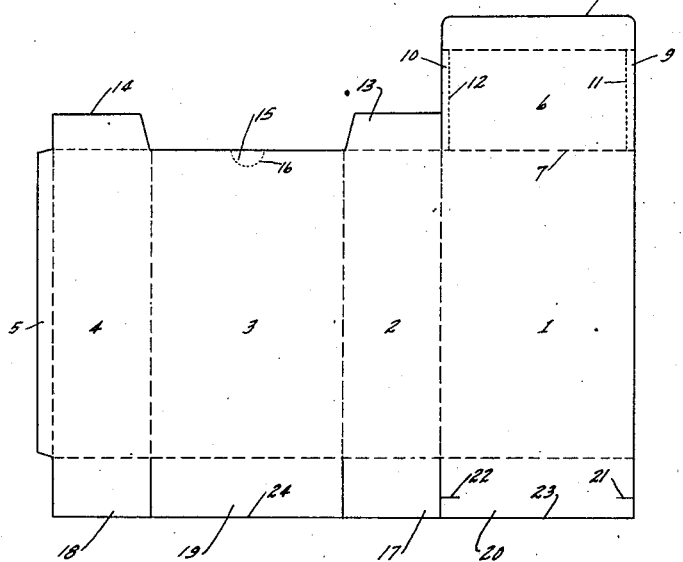

Referring now to Fig. 1 of the drawings, the blank for forming the carton has formed in succession thereon a rear wall 1, side wall 2, front wall 3, side wall 4 and glue flap 5. The rear wall has a top 6 secured to its upper end along a score line 7, the opposite side of the top having a tuck 8 which is adapted to be inserted inside of the front wall when the carton is completed and closed. The top also has glue-strips 9, 10 at its opposite sides, the limits of which are defined by weakened lines 11, 12. These weakened lines may be formed in several ways, depending upon the nature of the material from which the carton is formed and the equipment that is available. They may be formed by spaced short cuts which extend all the way through the material or they may be cut part way through from the under side or in some instances formed merely by scoring the material. The material from which these cartons are usually made has a smooth finish on its outer surface and the fibers on the outer surface are stronger than those on the inner surface. The object in thus defining these glue-strips is to have the material of the under side of the top split off when the top is raised and leave sections of less than the full thickness of the material adhering to the flaps to which they are glued.

The sides 2 and 4 of the carton have end flaps 13 and 14 at their upper ends and the front wall 3 has a potential thumb opening 15 defined by a perforated or readily fracturable line 16 so that the material of the piece 15 can be easily broken out. The glue flap 5, of course, is glued to the inside of the rear wall 1 when the carton is formed. At the lower ends the side walls 2 and 4 have end flaps 17 and 18 and the front wall has a sealing flap 19. The rear wall at its lower edge has a sealing flap 20 which is provided with two cuts 21, 22 extending in a short distance from its two edges. The cuts 21 and 22 are spaced such distances from the edge 23 of the sealing flap 20 that they will coincide with the edge 24 of the sealing flap 19 when the carton is formed.

Figure 2:
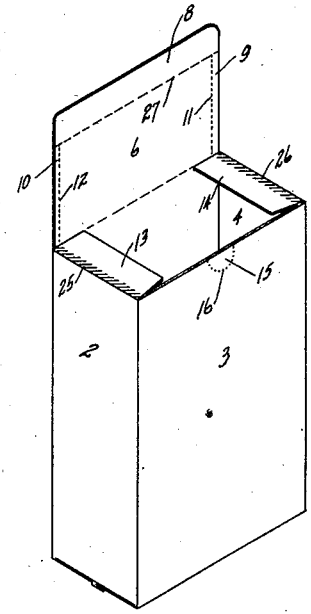
Fig. 2 shows the carton sealed at the bottom, the top being ready for closing.
Figure 3:
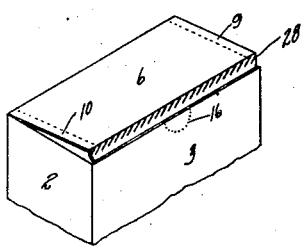
Fig. 3 shows the upper end of the carton with glue applied to the tuck and the top partly closed.

Fig. 2 shows a carton formed from the blank of Fig. 1 with the bottom sealed and the top ready to be closed. The flaps 13, 14 have been turned inwardly and glue applied in a narrow band near their outer edges as indicated at 25, 26. Glue has also been applied in a narrow band to the outer edge of the flap 8 adjacent to the score line 27, this glue being indicated at 28 on Fig. 3. In closing the carton the tuck 8 is placed within the front wall 3 and the glue-strip 28 causes the top edge of this tuck to be securely glued to the inner side of the front wall 3 near its top only, the glue-strip passing across the potential thumb opening 15, the lower end of the flap 8 being unsecured but extending well below the thumb opening 15. The top of the carton is tightly sealed along the top edge of the tuck 8 and to the flaps 13, 14 along the glue-strips 9 and 10.

Figure 4:
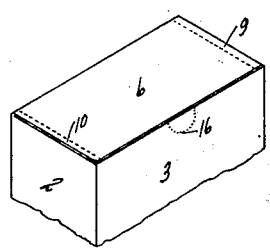
Fig. 4 shows the upper end of the carton closed and sealed.
Figure 5:
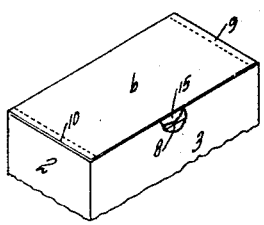
Fig. 5 shows the first operation or step in opening the carton.
Figure 6:
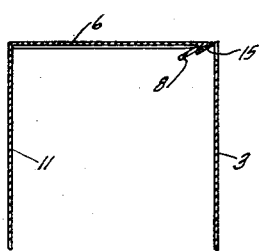
Fig. 6 is a section on line 6—6 of Fig. 7.
Figure 7:
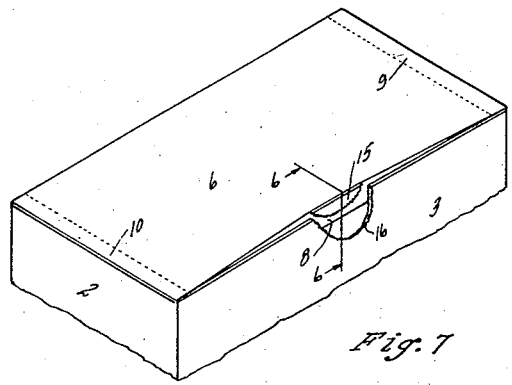
Figs. 7 and 8 show the carton at intermediate stages of opening and Fig. 9 shows it fully opened.
Figure 8:
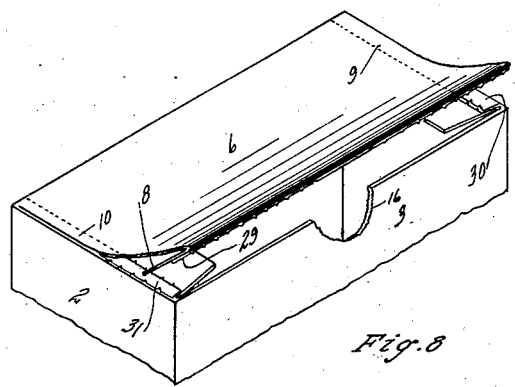
Figure 9:
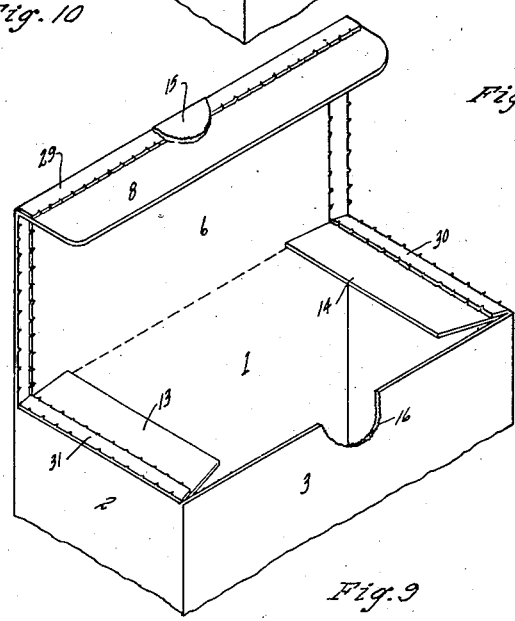

Fig. 4 shows the carton with the top completely closed. To open the carton the first operation is to break the line 16 with the thumb, as shown in Figs. 5 and 6, and then by pressing inwardly with the thumb the tuck 8 is gradually broken loose from the front wall 3 as shown in Figs. 7 and 8, a portion of the inner surface of the wall 3 splitting off and adhering to the top of the tuck where the two are glued together as shown at 29 in Fig. 9. It is not necessary to define the strip 29 by a weakened line because of the direction of the grain or fibers of the material. Then as the top is being raised the inner surface where it is glued to the flaps 13 and 14 splits and strips off along the weakened lines 11 and 12 as clearly shown in Figs. 8 and 9 leaving portions of the top adhering to the flaps as indicated at 30, 31. Without the weakened lines 11 and 12, which extend across the grain or fiber of the carton material the inner surface of the top will tear irregularly, usually toward the center, leaving large unsightly and obstructing connecting portions, with rough uneven edges. After the carton has been opened, it may be re-closed simply by inserting the tuck 8 within the front wall 3 and the carton when re-closed will present only finished edges and there will be no ragged torn parts on the outside.

Figure 10:
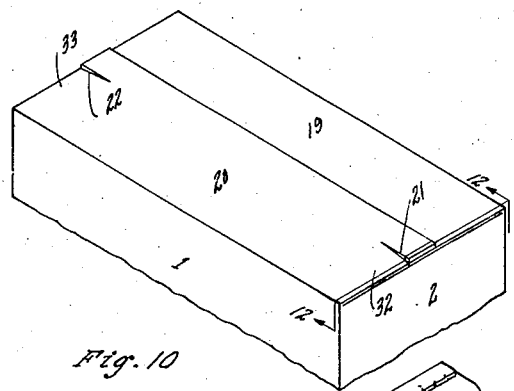
Fig. 10 shows the sealed bottom of the carton formed from the blank of Fig. 1.
Figure 11:
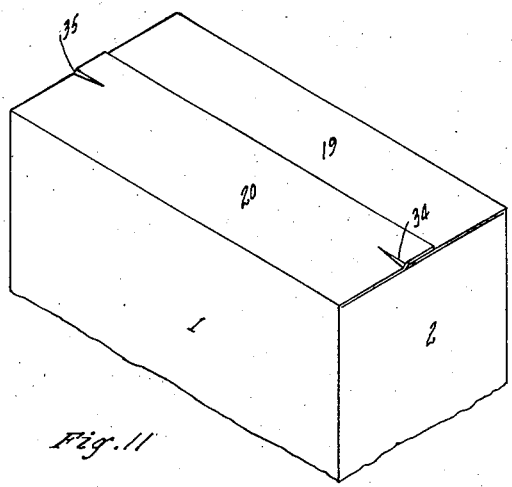
Fig. 11 shows a modified bottom closure.

As shown in Fig. 4, the top of the carton when sealed is absolutely tight and fine particles can not sift out nor can weevils or other insects enter the carton. In Figs. 10 and 11 I have shown how the bottom of the carton can also be sealed absolutely tight without the use of any additional material.

When the bottom of the carton is to be sealed, the end flaps 17 and 18 are turned inwardly and then the sealing flap 19 is turned in over and glued to the flaps 17 and 18. The next operation is to turn down the sealing flap 20 which is glued tightly to the flaps 17, 18 and 19, the cuts 21 and 22 falling in alignment with the edge 24 of the flap 19 and the portions 32, 33 of the flap 20 being pressed tightly into engagement with the end flaps 17, 18 as clearly shown in Figs. 10 and 12. This seals the bottom of the carton absolutely tight.

In Fig. 11 I have shown a slightly modified form of the bottom in which the material of the flap 20 is off-set by pressure at the points 34, 35, without cutting so that the flap 20 comes into intimate contact with the end flaps 17 and 18 and the off-set brings the material of the flap into tight contact with the edges of the sealing flap 19 at its ends.

Figure 12:
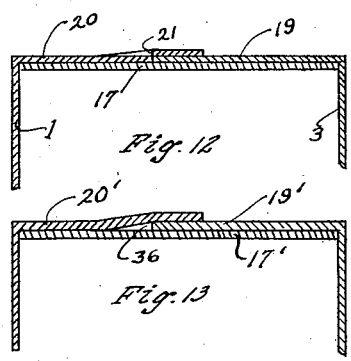
Fig. 12 is a section taken on line 12—12 of Fig. 10.
Figure 13:
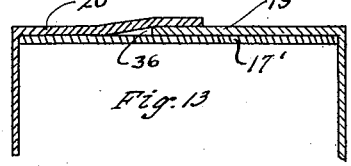
Fig. 13 is a section, similar to Fig. 12, showing the customary way of sealing the bottom of cartons.

Referring now to Figs. 12 and 13, Fig. 12 shows the bottom of the carton that I have illustrated in Fig. 10 and Fig. 13 shows how the bottoms of cartons have been sealed heretofore. As usually sealed, the flap 19' overlies and is glued to the flap 17' and then the sealing flap 20' is turned down and glued to both flaps 17' and 19', but this leaves a slight opening as indicated at 36 through which weevils may enter the box or fine materials may sift out. This is overcome by my invention as shown in Fig. 12 where the joints between the several end flaps are sealed absolutely tight.

Figure 14:
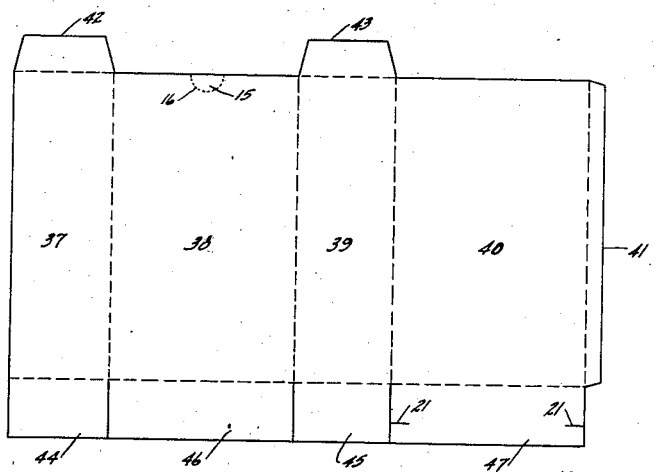
Figure 15:
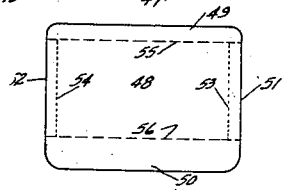
Fig. 15 shows the carton ready for closing.
Figure 15:
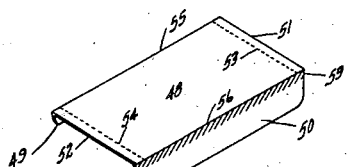
Figure 15:
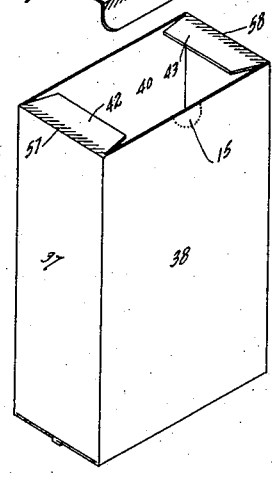
Figure 16:
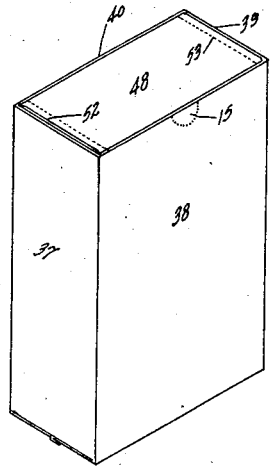
Fig. 16 shows the carton sealed.

In Figs. 14 to 16 I have shown a slight modification of my invention in which the same result is attained but with a minimum of material. The carton as shown in these figures is made from two pieces, the top being separate from the rest of the carton. The main blank, reading from left to right, has a side wall 37, front wall 38, side wall 39, rear wall 40 and glue-flap 41. The glue-flap 41 is provided at one edge of either the front or rear panel so that when the carton is formed it will be secured to one of the sides 37 or 39 and will not obstruct the entry of the tuck on the cover.

The side walls have their flaps 42, 43 at their tops and similar flaps 44, 45 at their bottom edges. Sealing flaps 46 and 47 for the lower end of the carton are provided which are in all respects similar to the sealing flaps shown at the lower end of the blank in Fig. 1. The top 48 has a glue-flap 49 at its rear edge, there being glue-strips 51, 52 formed at the sides of the top by weakened lines 53, 54. The top is scored along the lines 55, 56 so that the flap 49 and tuck 50 may be easily bent down.

Fig. 15 shows the carton formed from the blanks of Figs. 14 and 14A ready for filling. The flaps 42, 43 have been turned inwardly and narrow bands of glue applied at 57, 58 on the flaps 42, 43 and similar narrow bands of glue being applied to the outside of the flap 49 and to the upper edge of the tucking flap 50 as indicated at 59 in Fig. 15. The narrow band of glue can not be seen on the flap 49 but it is at the rear in Fig. 15 and both the flap 49 and tuck 50 are inserted inside of the carton so that when it is sealed it is as shown in Fig. 16. This form of the invention is opened the same as that previously described. The bottom, of course, may be formed either as shown in Fig. 10 or Fig. 11 or in any other suitable way.

While I have shown and described specific embodiments of my invention and identified certain parts by certain terms, it will, of course, be understood that the illustrations and terms used are but illustrative of the invention and are not to be considered limitations thereon other than as defined in my claims, but I claim as my invention all equivalents and modifications thereof.

What I claim is:

1. A carton having front, rear and side walls, the side walls having inturned flaps, a top secured to the rear wall and overlying said flaps, said top having a glue-strip at each side edge fixedly secured to said flaps, each glue-strip being limited by a weakened line extending across the top of its underside only, whereby upon opening said top the material of said glue-strips will split and only their under parts adhere to said flaps the outer surface of the top will remain continuous and unbroken.

2. A carton having front, rear and side walls, the side walls having inturned flaps, a top secured to the rear wall and overlying said flaps, said top having a glue-strip at each side edge fixedly secured to said flaps, each glue-strip being defined by a weakening line extending across the top and cut partly through the thickness of the material from the inside only, said top having a tuck at its front side lying within said front wall, a potential thumb-hole defined on said front wall by a readily fracturable line overlying said tuck, said tuck at its top edge being fixedly secured to the front wall along a narrow glue-strip which extends across said potential thumb-hole, the lower part of said tuck being unsecured, whereby upon breaking said fracturable line and turning said tuck inwardly and raising said top the material of said glue-strips will progressively split off from said front wall and top and parts thereof adhere to said tuck and end flaps and the outer faces of said front wall and top will remain continuous and unbroken.

3. A carton having front, rear and side walls, end flaps on the side walls turned inwardly, a sealing flap on the front wall overlying and secured to said end flaps, a second sealing flap on the rear wall overlapping and secured to said first sealing flap and end flaps, said second sealing flap being cut inwardly from its opposite ends in alignment with the overlapped edge of said first sealing flap, those parts of the second flap adjacent said cuts being off-set into tight engagement with said end flaps.

4. A carton having front, rear and side walls, end flaps on the side walls turned inwardly, a sealing flap on the front wall overlying and secured to said end flaps, a second sealing flap on the rear wall overlapping and secured to said first sealing flap and end flaps, the ends of said second sealing flap at the overlapped edge of the first sealing flap being off-set into the plane of the first sealing flap and into tight engagement with said end flaps.

5. A carton having front, rear and side walls, the side walls at their tops having inturned flaps, a top secured to the rear wall and overlying said flaps, said top having a glue-strip at each side edge fixedly secured to said flaps, each glue-strip being defined on said top by a weakened line, whereby upon opening said top the material of said glue-strips will split and their under parts adhere to said flaps, the side walls at their bottom ends having inturned ends flaps, a sealing flap on the lower end of the front wall overlying and secured to said end flaps, a second sealing flap on the lower end of the rear wall overlapping and secured to said first sealing flap and end flaps, said second sealing flap having cuts extending inwardly from its opposite edges in alignment with the overlapped edge of said first sealing flap, the parts of the second flap adjacent said cuts being off-set into tight engagement with said end flaps.

6. A carton having front, rear and side walls, the side walls at their tops having inturned flaps, a top secured to the rear wall and overlying said flaps, said top having a glue-strip at each side edge fixedly secured to said flaps, each glue-strip being defined on said top by a weakened line, whereby upon opening said top the material of said glue-strips will split and their under parts adhere to said flaps, the side walls at their bottom ends having inturned end flaps, a sealing flap on the lower end of the front wall overlying and secured to said end flaps, a second sealing flap on the lower end of the rear wall overlapping and secured to said first sealing flap and end flaps, the ends of said second sealing flap at the overlapped edge of the first sealing flap being off-set into the plane of the first sealing flap and into tight engagement with said end flaps.

7. A carton having front, rear and side walls formed from a single piece blank, a top for closing said carton having a downwardly turned flap and a downwardly turned tuck on its rear and front edges, the flap being fixedly secured to the inside of the rear wall at its top, the tuck lying within the front wall, a potential thumb-opening defined by a readily fracturable line on the front wall at its top and overlying said tuck, said tuck at its top being fixedly secured to the front wall along a narrow glue-strip extending across said potential thumb-opening, the lower part of the tuck being unsecured, there being inturned end flaps underlying said top, said top having a glue-strip at each side edge fixedly secured to said end flaps, the glue-strips that extend across the fibers of the material being defined by lines cutting the fibers only on the underside so that the material of the glue-strips will split and the inside part adhere to the parts to which they are glued and the outer surface will remain unbroken when the carton is opened.

BRUCE J. DAVIDSON.